H. T. THOMAS.
SIX CYLINDER V-TYPE ENGINE.
APPLICATION FILED JUNE 3, 1916.

1,283,970.

Patented Nov. 5, 1918.
3 SHEETS—SHEET 1.

Inventor
HORACE T. THOMAS.

By Ralzemond A. Parker
Attorney

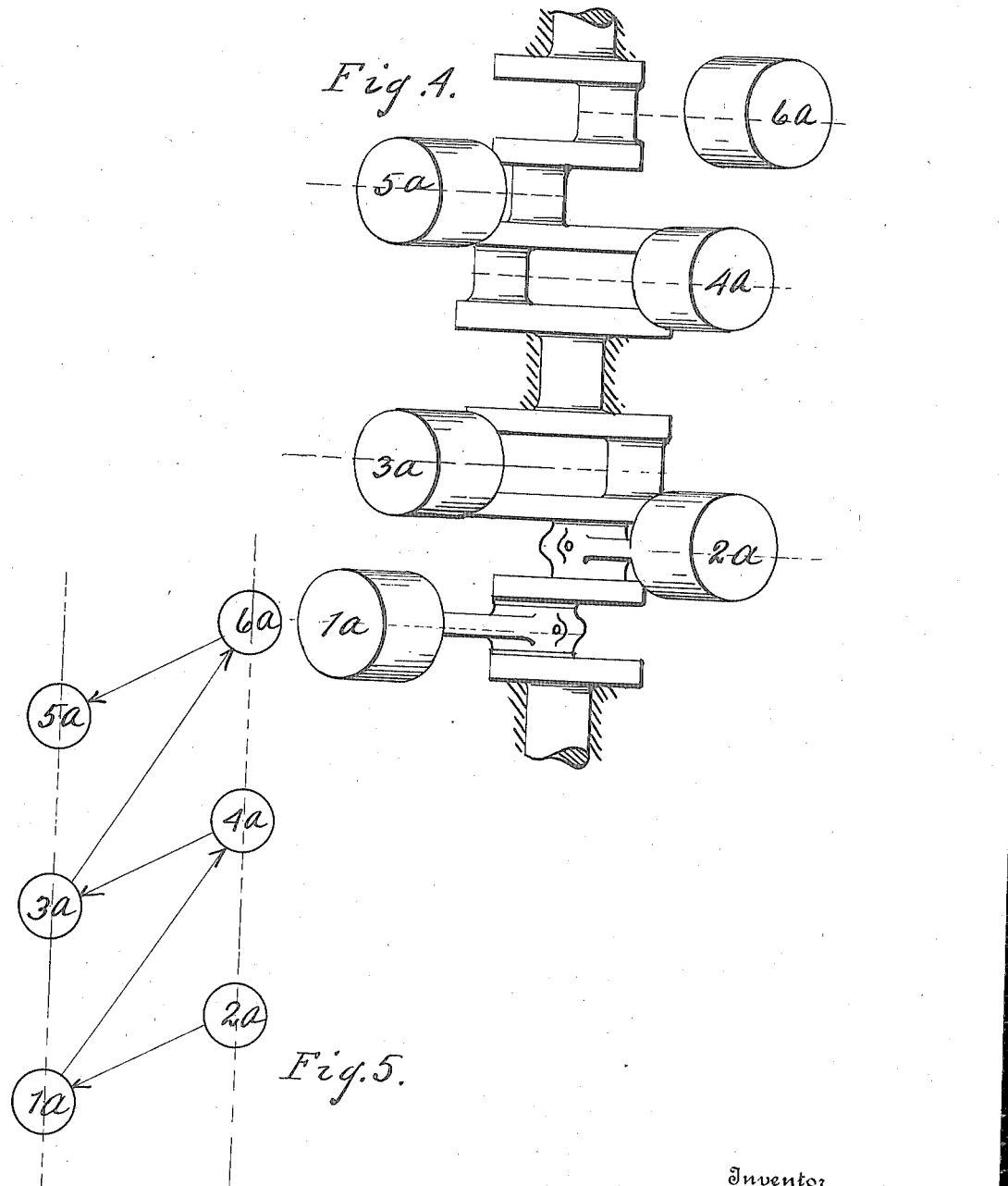

H. T. THOMAS.
SIX CYLINDER V-TYPE ENGINE.
APPLICATION FILED JUNE 3, 1916.
1,283,970.
Patented Nov. 5, 1918.
3 SHEETS—SHEET 3.
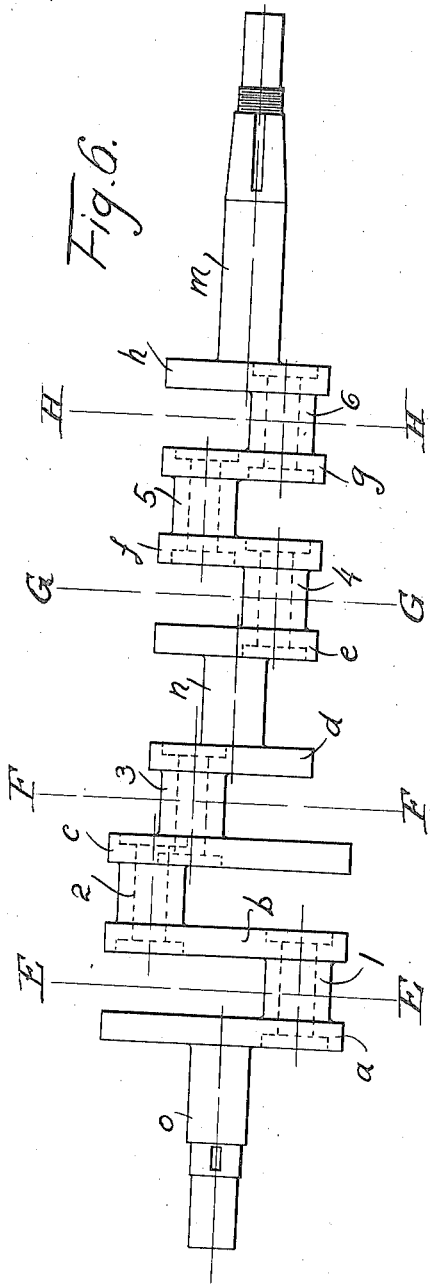
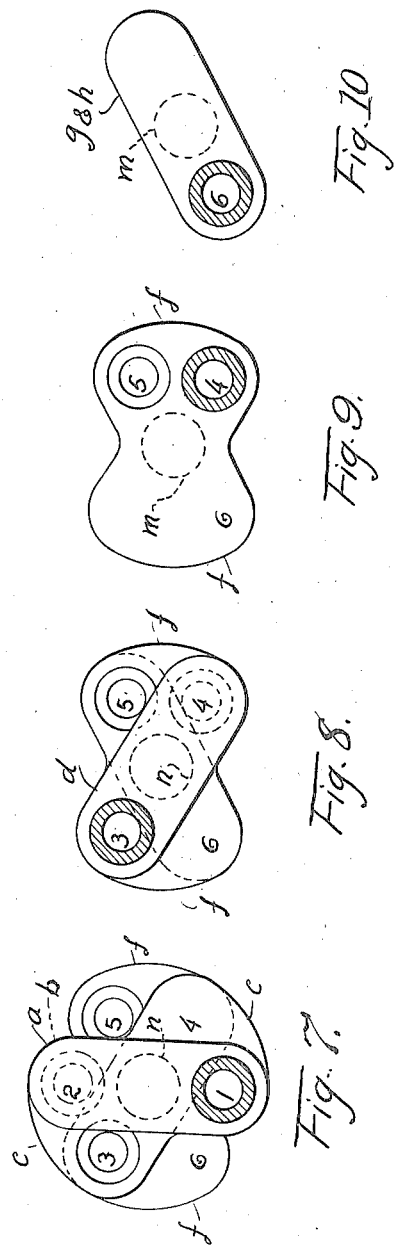
INVENTOR
Horace T. Thomas
BY
Reizemond A. Parker
ATTORNEY

UNITED STATES PATENT OFFICE.

HORACE T. THOMAS, OF LANSING, MICHIGAN.

SIX-CYLINDER V-TYPE ENGINE.

1,283,970.   Specification of Letters Patent.   Patented Nov. 5, 1918.

Application filed June 3, 1916. Serial No. 101,435.

*To all whom it may concern:*

Be it known that I, HORACE T. THOMAS, a citizen of the United States, residing at Lansing, county of Ingham, State of Michigan, have invented a certain new and useful Improvement in Six-Cylinder V-Type Engines, and declare the following to be a full, clear, and exact description of the same, such as will enable others skilled in the art to which it pertains to make and use the same, reference being had to the accompanying drawings, which form a part of this specification.

My invention relates to multi-cylinder internal combustion engines and a special object of my improvements is to produce a six-cylinder engine of the V-type with a uniform impulse; that shall obviate vibration, and injurious forces due to the inertia of the parts.

I secure this object in the device illustrated in the accompanying drawings in which;

Fig. 4 is a view similar to Fig. 1 showing a different arrangement of the cylinders.

Fig. 5 is a diagram similar to Fig. 3 showing a firing order adapted to the arrangement of Fig. 4.

Fig. 6 is a plan view of the shaft in a different position from that shown in Fig. 1.

Fig. 7 is a section on the line E—E Fig. 4.

Fig. 8 is a section on the line F—F Fig. 4.

Fig. 9 is a section on the line G—G Fig. 4.

Fig. 10 is a section on the line H—H Fig. 4.

Figures 1, 2, 3:
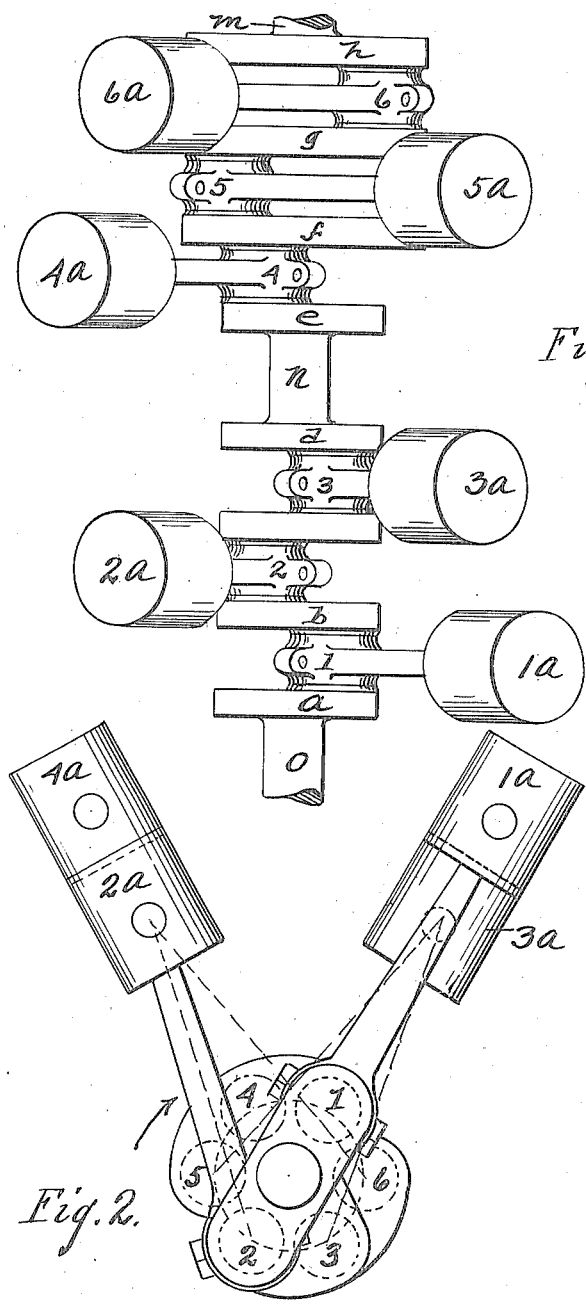
Figure 1 is a plan view showing the crank shaft, with pistons and connecting rods in place, embodying my invention.
Fig. 2 is an end elevation of the same looking in the direction of the arrows.
Fig. 3 is a diagrammatic view illustrating the order of firing of the cylinders.

In describing the engine the observer is supposed to stand in front of the vehicle facing the engine and the ordinals of the cylinders or pertinent parts are such that cylinder #1, for instance, is nearest to the observer and #2 is the next and so on. The rotation of the crank shaft shown by the arrow in Fig. 2 is right-handed or clockwise which is the direction almost universally employed because of the use of the right hand in cranking.

The direction of rotation of the fly wheel is indicated by reference to whether its highest point approaches or recedes from the nearest cylinder.

In speaking of the crank shaft and the relative arrangement of the cranks I shall speak of a left-handed spiral which means that as in the view of Fig. 2, the successive cranks would follow each other consecutively in the opposite direction to the arrow of Fig. 2.

It will be observed that each piston is joined by its connecting rod to a separate crank pin and that the pistons are located in groups of three, one group upon one side of the crank shaft and the other upon the other, the pistons of each group being in one plane and the planes being at an angle of 60 degrees to each other and passing through the axis of the crank shaft. It will also be noticed that the crank pins are equally spaced around the circle and at 60 degrees to each other. There are pairs of cranks extending in planes 180 degrees to each other and these pairs are successively in planes at 60 degrees to each other, each to the next, that is to say, cranks 1 and 2 are opposite or at 180 degrees to each other and cranks 3 and 4 are similarly relatively located and also at 60 degrees to the cranks 1 and 2 with a left hand or inverse clockwise rotation, and cranks 5 and 6 are similarly located relative to each other and to the cranks 3 and 4. This arrangement makes a crank shaft having its crank or wrist pins located in a left-handed spiral.

The cylinders and corresponding pistons are arranged with the odd numbered cylinders at the left of the vehicle, or which is the same thing, the right of the engine according to the convention above noted.

*a* is a crank arm having the crank pin 1 at one end. The arm *a* is extended beyond the shaft and is more or less symmetrical in outline on each side of the shaft. The crank pin and arm may be bored out as indicated in dotted lines so that the part of the arm *a* which is beyond the crank shaft balances the part of the arm *a* which supports the crank pin and also half of said pin, or the projecting part may be larger.

*b* is a crank arm parallel to the crank arm *a* having a crank pin 1 at one end and a crank pin 2 at the other end. These pins may be bored out and the arm and the half pin pertaining thereto are symmetrical on each side of the crank shaft and therefore balance each other. The crank arm *c* has the same form in outline as the crank arm *f* as shown in Fig 9. It has at one end the crank pins 2 and 3 which may be bored out, which pins are located at an angle of 60 degrees to each other, and at the other end is a similar outline, thus this arm with the half pins at one end thereof are balanced about the axis of the shaft.

*d* is a crank arm of the same construction as the crank arm *a* and united with the intermediate bearing *n*.

*e* is a crank arm united to the other end of the bearing *n* and having the same shape as the arm *d* but having the wrist pin which may be hollow at the opposite end.

*f* is a crank arm shown in outline in Fig. 9 entirely similar to the crank arm *c* and having the crank pins 4 and 5 at one end of the outline shown that causes it to be balanced in connection with the half pins at its end about the axis of the crank shaft.

*h* is a crank arm similar to the crank arm *a*.

The various pistons are designated by $1^a$, $2^a$, $3^a$, $4^a$, $5^a$, $6^a$.

The crank shaft is arranged as follows: The crank pin 2 is at 180 degrees to the crank pin 1, the crank pin 3 is 60 degrees behind the crank pin 2, the crank pin 4 is at 180 degrees to the crank pin 5. The crank pin 5 is 60 degrees behind the crank pin 4 and the crank pin 6 is opposite the crank pin 5.

The order of firing with the arrangement shown in Fig. 1 is 1, 2, 3, 4, 5, 6.

I have experimentally examined into the action of this type of engine to confirm my conclusion. I have noted that the vertical vibration is more apt to be felt in an automobile and that the horizontal vibration is not as injurious and therefore it has been my object, having reduced the vibration as much as practicable, to choose the horizontal rather than the vertical vibration when conditions permit of having a choice between the two.

It is to be noticed that in this arrangement of the cranks and cylinders the impulses are equally spaced 60 degrees apart and it is found that there is very little vibration due to the running of the engine.

I have found by extensive experiment that a shaft of this spiral with this cylinder placing and rotational direction produces the least vibration. It will be noted that the arrangement of the cylinders gives room for the steering post and apparatus at the rear of the engine and left of the car, and by reference to Fig. 3, it will be seen that the working strokes alternate between the two sets of pistons.

I have shown an engine with two end bearings for the crank shaft and one intermediate bearing but this is merely one embodiment of my invention and other known arrangements of bearings may, of course be used.

Of course a slight variation from the 60 degree angles specified would make but little difference and would be within my invention.

In Fig. 4 the cylinders indicated by odd numbers are at the right of the car. While this arrangement has a number of advantages over the previous art it is believed to be inferior to the arrangement shown in Fig. 1.

What I claim is:

1. The combination of a 6-cylinder engine of the V-type of two sets of cylinders having pistons reciprocating in planes at 60 degrees to each other, a crank shaft having six cranks respectively connected to said pistons, said cranks being arranged in adjacent pairs, the constituent cranks of each pair being arranged at 180 degrees to each other and adjacent pairs of cranks being arranged at 60 degrees to each other in a left-handed spiral, the odd numbered cylinders being at the right of the engine.

2. The combination in a 6-cylinder engine of the V-type of two sets of cylinders having pistons reciprocating in planes at 60 degrees to each other, a crank shaft having six cranks respectively connected to said pistons, said cranks being arranged in adjacent pairs, the constituent cranks of each pair being arranged at 180 degrees to each other and adjacent pairs of cranks being arranged at 60 degrees to each other, the odd numbered cylinders being at the right of the engine, the order of firing the charge in said cylinders being arranged to alternate between the two sets of cylinders and to be equally angularly spaced.

3. The combination in a 6-cylinder engine of the V-type of two sets of cylinders having pistons reciprocating in planes at 60 degree to each other, a crank shaft having six cranks respectively connected to said pistons, said cranks being arranged in adjacent pairs, the constituent cranks of each pair being arranged at 180 degrees to each other and adjacent pairs of cranks being arranged at 60 degrees to each other in a left-handed spiral, the odd numbered cylinders being at the right of the engine, said engine being arranged to give the order of firing 1—2—3—4—5—6.

4. The combination in a 6-cylinder engine having its upwardly extending cylinders alternately placed approximately 30 degrees each side of a vertical median plane, of a crank shaft having six cranks in three pairs of two opposed cranks each, said cranks being arranged to form a left spiral, said engine being arranged for firing the cylinders consecutively from one end of the shaft to the other and repeat, as the shaft rotates the fly wheel top from the nearest and sixth cylinder.

5. The combination of a 6-cylinder engine having upwardly extending cylinders alternately placed approximately 30 degrees each side of a vertical median plane, of six cranks arranged in three pairs, each pair comprising two diametrically opposed cranks and each of said pairs being set 60 degrees from the adjacent pairs to form a left spiral, said engine being arranged for firing the cylinders alternately across the median plane.

6. The combination in a 6-cylinder engine having upwardly extending cylinders alternately placed approximately 30 degrees each side of a vertical median line, of three pairs of cranks each comprising two cranks 180 degrees apart and each pair set 60 degrees from the adjacent pairs to form a left spiral, said engine being arranged for firing the cylinders alternately across the median plane when the top of the fly wheel moves from the nearest cylinder.

7. An engine having three cylinders set with their axes approximately at 30 degrees to one side of a plane passing through the crank shaft and alternating lengthwise the shaft with three cylinders similarly placed 60 degrees away to the opposite side of the said plane, a crank shaft having three pairs of oppositely disposed cranks each pair being 60 degrees angularly away from its neighbors and forming an irregular left spiral having the cranks equally spaced angularly, connecting rods joining the first cranks of each pair to the pistons of the cylinders on one side of the plane and the second cranks of each pair to the pistons on the opposite side of the plane, said engine being arranged to actuate the cylinders alternately from one side of the plane to the other.

8. A 6-cylinder engine of the V-type having the cylinders alternatingly opposite and approximately 30 degrees from a vertical median plane, a crank shaft composed of three pairs of cranks oppositely disposed set 60 degrees from each other to form a left spiral and revolving the top surface of the said shaft toward the odd numbered cylinders, said engine being arranged to cause the cylinder impulses to follow each other in the cylinders 1, 2, 3, 4, 5, 6 as numbered.

In testimony whereof I sign this specification.

HORACE T. THOMAS.